United States Patent
Shaikh et al.

(10) Patent No.: US 7,345,116 B2
(45) Date of Patent: Mar. 18, 2008

(54) CLEAR POLYCARBONATE POLYESTER BLEND

(76) Inventors: Abbas-Alli Ghudubhai Shaikh, Balagi Garden, Apt. 101, Khundalahalli, Gate Whitefield (PO), Bangalore (IN) 560 066; Manatesh Chakraborty, D 2/14, Chittaranjan Nagar, P.O. Rajawadi Vidhyavihar, Maharashtrs, Mumbai (IN) 400 077; Manickam Jayakannan, 13/743, Pourmami, Kunnukuzhy Trivandrum, Kerala (IN) 695 037; Ganesh Kannan, 202, Victorian Willows, Airport Road, Bangalore, Karnataka (IN) 560 017; Vishvajit Chandrakant Juikar, 1597, 4 Main Road, E Block, AECS Layout, Kundanhalli, Bangalore, Karnataka (IN) 560 037; Rajashekhar Shiddappa Totad, 74/7, C/O vijay Kumar, 1st Main, Laxmisagar Layout, Mahadevapura Post, Bangalore, Karnataka (IN) 560 048

( * ) Notice: Subject to any disclaimer, the term of this patent is extended or adjusted under 35 U.S.C. 154(b) by 69 days.

(21) Appl. No.: 11/457,201

(22) Filed: Jul. 13, 2006

(65) Prior Publication Data
US 2006/0247389 A1   Nov. 2, 2006

Related U.S. Application Data

(62) Division of application No. 10/742,407, filed on Dec. 19, 2003, now abandoned.

(51) Int. Cl.
C08L 69/00 (2006.01)
C08L 67/02 (2006.01)
C08J 3/00 (2006.01)

(52) U.S. Cl. ......................... 525/439; 525/53; 366/79; 366/88; 366/90

(58) Field of Classification Search ...................... None
See application file for complete search history.

(56) References Cited

U.S. PATENT DOCUMENTS

| | | | |
|---|---|---|---|
| 2,465,319 A | 3/1949 | Rex et al. | |
| 2,991,273 A | 7/1961 | Hechelhammer et al. | |
| 2,999,835 A | 9/1961 | Goldberg | |
| 3,028,365 A | 4/1962 | Schnell et al. | |
| 3,148,172 A | 9/1964 | Fox | |
| 3,153,008 A | 10/1964 | Fox | |
| 3,169,121 A | 2/1965 | Goldberg | |
| 3,271,367 A | 9/1966 | Schnell | |
| 3,271,368 A | 9/1966 | Goldberg et al. | |
| 4,125,572 A | 11/1978 | Scott | |
| 4,188,314 A | 2/1980 | Fox et al. | |
| 4,217,438 A | 8/1980 | Brunelle et al. | |
| 4,391,954 A | 7/1983 | Scott | |
| 4,487,896 A | 12/1984 | Mark et al. | |
| 4,506,442 A | 3/1985 | Alxmann et al. | |
| 4,786,692 A | 11/1988 | Allen et al. | |
| 4,897,453 A | 1/1990 | Flora et al. | |
| 5,194,523 A | 3/1993 | Small, Jr. et al. | |
| 5,207,967 A | 5/1993 | Small, Jr. | |
| 5,367,011 A | 11/1994 | Walsh | |
| 5,411,999 A | 5/1995 | Gallucci | |
| 5,461,120 A | 10/1995 | Mason et al. | |
| 5,478,896 A | 12/1995 | Scott | |
| 5,491,179 A | 2/1996 | Mason | |
| 6,281,299 B1 | 8/2001 | Saito et al. | |
| 2004/0127653 A1 | 7/2004 | Ellington et al. | |

FOREIGN PATENT DOCUMENTS

| EP | 774491 | 5/1997 |
|---|---|---|
| WO | 2002038675 | 5/2002 |
| WO | 2004020523 | 3/2004 |

OTHER PUBLICATIONS

Polymer, "Compatibility Characterization of Polycarbonate/Copolyester Blends", vol. 41, pp. 5759-5767, 2000.
Research Disclosure Journal, "Compatible Polyester / Polycarbonate Blends", Research Disclosure Database No. 229021, May 1983.

*Primary Examiner*—David J. Buttner
(74) *Attorney, Agent, or Firm*—Marina Larson & Associates, LLC

(57) ABSTRACT

An optically clear thermoplastic resin composition is disclosed which comprises structural units derived from substituted or unsubstituted polycarbonate and substituted or unsubstituted polyester, wherein said polyester comprises structural units derived from terephthalic acid and a mixture of 1,4-cyclohexane dimethanol and ethylene glycol, wherein said ethylene glycol is greater than about 60 mole percent based on total moles of 1,4-cyclohexane dimethanol and ethylene glycol. In addition the composition disclosed possess good environmental stress cracking resistance, flow and thermal properties.

10 Claims, 1 Drawing Sheet

CLEAR POLYCARBONATE POLYESTER BLEND

This application is a divisional of application Ser. No. 10/742,407 filed Dec. 19, 2003 now abandoned.

BACKGROUND OF THE INVENTION

This invention relates to an optically clear thermoplastic resin composition, a method to synthesize the composition and articles made from the compositions.

Polycarbonate is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation, and poor processability. Blends polyesters with polycarbonates provide thermoplastic compositions having improved properties over those based upon either of the single resins alone. Moreover, such blends are often more cost effective than polycarbonate alone.

Transparent blends of polycarbonate (PC) and polyesters have attractive properties such as toughness and chemical resistance. The miscibility of PC with the polyesters gives the blends the clarity needed, but this is restricted to (semi) aliphatic polyesters such as poly(cyclohexane dimethanol cyclohexane dicarboxylate) (PCCD) or a glycolized copolyester such as polyethylene glycol cyclohexane dimethanol terephthalate (PETG). PCT patent application no. WO 02/38675 discloses a thermoplastic composition comprising PC, PCCD, and an impact modifier.

U.S. Pat. Nos. 4,188,314, 4,125,572; 4,391,954; 4,786,692; 4,897,453, and 5,478,896 relate to blends of an aromatic polycarbonate and poly cyclohexane dimethanol phthalate. U.S. Pat. No. 4,125,572 relates to a blend of polycarbonate, polybutylene terephthalate (PBT) and an aliphatic/cycloaliphatic iso/terephthalate resin. U.S. Pat. No. 6,281,299 discloses a process for manufacturing transparent polyester/polycarbonate compositions, wherein the polyester is fed into the reactor after bisphenol A is polymerized to a polycarbonate.

The patents, U.S. Pat. Nos. 5,194,523 and 5,207,967 describe the blending of polyester (polycyclohexane dimethanol terephthalate, "PCT") with bisphenol-A polycarbonate to obtain blends with improved low temperature impact strength and processability. The U.S. Pat. No. 4,786,692 describes a clear thermoplastic molding composition of polycarbonate with PETG with the ethylene glycol content between 20 to 80 percent. However the patent requires that the said lend becomes semi transparent and opaque when the ethylene glycol content is high at least greater than 50 percent. The U.S. Pat. No. 5,194,523 describes a clear blend of polycarbonate and PETG where the amount of ethylene glycol is between 15 percent and 30 percent. The blends were synthesized using the residual catalyst present in the polyester. U.S. Pat. No. 4,506,442 discloses a polycarbonate/polyester blend and an uncatalyzed process for preparing the blend by melt reactions between PC and polyesters for a long period of time (mixing time of up to 60 minutes).

The blends of polycarbonate with PETG having a ethylene glycol content of up to 67 percent prepared without the addition of external catalyst have been reported to be unstable. Polycarbonate blends with PETG wherein the ethylene glycol content is greater than 60 percent have been found to give opaque incompatible blends.

There is a continuing need for polycarbonate polyester blends having a good balance of transparency, processability, solvent resistance and environmental stress cracking resistance in addition to good mechanical and thermal properties.

BRIEF DESCRIPTION OF THE INVENTION

The present inventors have unexpectedly discovered that optically clear thermoplastic resin composition containing structural units derived from substituted or unsubstituted polycarbonate and substituted or unsubstituted polyester, wherein said polyester comprises structural units derived from terephthalic acid and a mixture of 1,4-cyclohexane dimethanol and ethylene glycol, wherein said ethylene glycol is greater than about 60 mole percent based on total moles of 1,4-cyclohexane dimethanol and ethylene glycol show excellent combinations of flow, thermal and environmental resistance properties. Also disclosed is a synthesis method for the optically clear thermoplastic resin compositions of the present invention and articles derived from said composition.

Various other features, aspects, and advantages of the present invention will become more apparent with reference to the following description, examples, and appended claims.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
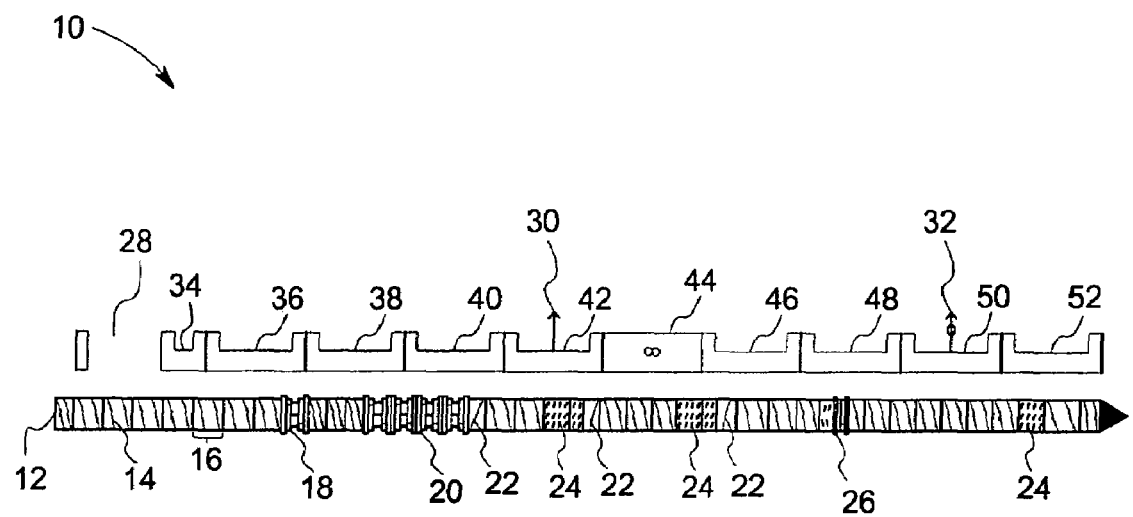
FIG. 1 illustrates a schematic diagram of the extrusion process in the prior art.

The present invention may be understood more readily by reference to the following detailed description of preferred embodiments of the invention and the examples included herein. In this specification and in the claims, which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester A component of the blend of the invention is an aromatic polycarbonate. The aromatic polycarbonate resins suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411,999, the respective disclosures of which are each incorporated herein by reference.carbonates.

Polycarbonates useful in the invention comprise repeating units of the formula:

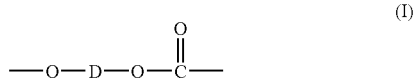

wherein $R^1$ is a divalent aromatic radical derived from a dihydroxyaromatic compound of the formula HO-D-OH, wherein D has the structure of formula:

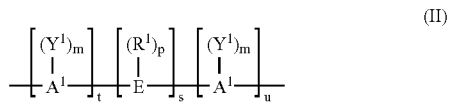

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^1$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^1$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^2$ wherein $R^2$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "m" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In dihydroxy-substituted aromatic hydrocarbons in which D is represented by formula (II) above, when more than one $Y^1$ substituent is present, they may be the same or different. The same holds true for the $R^1$ substituent. Where "s" is zero in formula (II) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene.

In some embodiments of dihydroxy-substituted aromatic hydrocarbons E may be an unsaturated alkylidene group. Suitable dihydroxy-substituted aromatic hydrocarbons of this type include those of the formula (III):

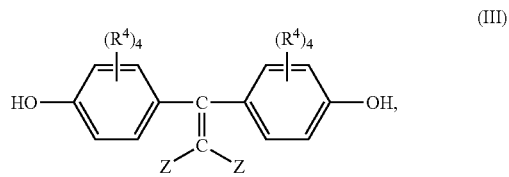

where independently each $R^4$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable dihydroxy-substituted aromatic hydrocarbons also include those of the formula (IV):

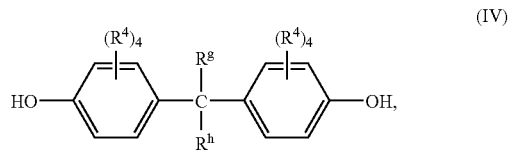

where independently each R4 is as defined hereinbefore, and independently Rg and Rh are hydrogen or a C1-30 hydrocarbon group.

In some embodiments of the present invention, dihydroxy-substituted aromatic hydrocarbons that may be used comprise those disclosed by name or formula (generic or specific) in U.S. Pat. Nos. 2,991,273, 2,999,835, 3,028,365, 3,148,172, 3,153,008, 3,271,367, 3,271,368, and 4,217,438. In other embodiments of the invention, dihydroxy-substituted aromatic hydrocarbons comprise bis(4-hydroxyphenyl)sulfide, bis(4-hydroxyphenyl) ether, bis(4-hydroxyphenyl)sulfone, bis(4-hydroxyphenyl)sulfoxide, 1,4-dihydroxybenzene, 4,4'-oxydiphenol, 2,2-bis(4- hydroxyphenyl)hexafluoropropane; 4,4'-(3,3,5-trimethylcyclohexylidene)diphenol; 4,4'-bis(3,5-dimethyl)diphenol, 1,1-bis(4-hydroxy-3-methylphenyl)cyclohexane; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl)ethane; 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; dihydroxy naphthalene; 2,6-dihydroxy naphthalene; hydroquinone; resorcinol; C1-3 alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 1,1-bis(4-hydroxyphenyl)cyclohexane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis(3,5-dimethylphenyl-4-hydroxyphenyl)-2-methylbutane; 3,3-bis(3,5-dimethylphenyl-4-hydroxyphenyl)pentane; 1,1-bis(3,5-dimethylphenyl-4-hydroxyphenyl)cyclopentane; 1,1-bis(3,5-dimethylphenyl-4-hydroxyphenyl)cyclohexane; bis(3,5-dimethyl-4-hydroxyphenyl) sulfoxide, bis(3,5-dimethyl-4-hydroxyphenyl) sulfone and bis(3,5-dimethyl-4-hydroxyphenyl)sulfide. In a particular embodiment the dihydroxy-substituted aromatic hydrocarbon comprises bisphenol A.

In some embodiments of dihydroxy-substituted aromatic hydrocarbons when E is an alkylene or alkylidene group, said group may be part of one or more fused rings attached to one or more aromatic groups bearing one hydroxy substituent. Suitable dihydroxy-substituted aromatic hydrocarbons of this type include those containing indane structural units such as represented by the formula (V), which compound is 3-(4-hydroxyphenyl)-1,1,3-trimethylindan-5-ol, and by the formula (VI), which compound is 1-(4-hydroxyphenyl)-1,3,3-trimethylindan-5-ol:

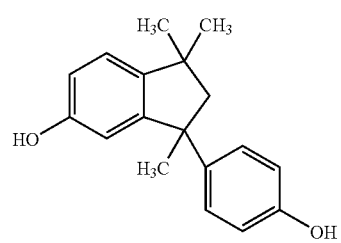

(V)

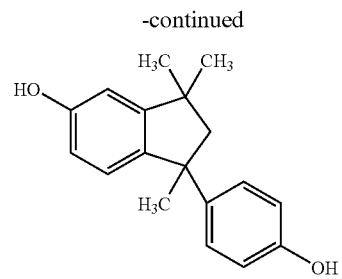

(VI)

Also included among suitable dihydroxy-substituted aromatic hydrocarbons of the type comprising one or more alkylene or alkylidene groups as part of fused rings are the 2,2,2',2'-tetrahydro-1,1'-spirobi[1H-indene]diols having formula (VII):

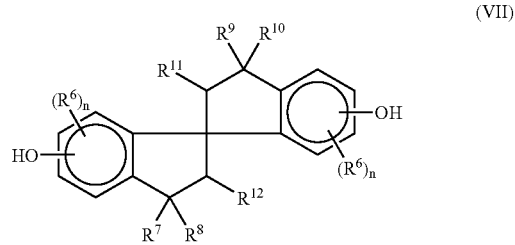

(VII)

wherein each R6 is independently selected from monovalent hydrocarbon radicals and halogen radicals; each R7, R8, R9, and R10 is independently C1-6 alkyl; each R11 and R12 is independently H or C1-6 alkyl; and each n is independently selected from positive integers having a value of from 0 to 3 inclusive. In a particular embodiment the 2,2,2',2'-tetrahydro-1,1'-spirobi[1H-indene]diol is 2,2,2',2'-tetrahydro-3,3,3',3'-tetramethyl-1,1'-spirobi[1H-idene]-6,6'-diol (sometimes known as "SBI"). Mixtures of alkali metal salts derived from mixtures of any of the foregoing dihydroxy-substituted aromatic hydrocarbons may also be employed.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1-C32 alkyl optionally substituted with one or more groups selected from C1-C32 alkyl, C3-C15 cycloalkyl or aryl; and C3-C15 cycloalkyl optionally substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals ale those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6-C15 aryl optionally substituted with one or more groups selected from C1-C32 alkyl, C3-C15 cycloalkyl or aryl. Some particular illustrative examples of aryl radicals comprise substituted or unsubstituted phenyl, biphenyl, toluyl and naphthyl.

Mixtures comprising two or more hydroxy-substituted hydrocarbons may also be employed. In some particular embodiments mixtures of at least two monohydroxy-substituted alkyl hydrocarbons, or mixtures of at least one monohydroxy-substituted alkyl hydrocarbon and at least one dihydroxy-substituted alkyl hydrocarbon, or mixtures of at least two dihydroxy-substituted alkyl hydrocarbons, or mixtures of at least two monohydroxy-substituted aromatic hydrocarbons, or mixtures of at least two dihydroxy-substituted aromatic hydrocarbons, or mixtures of at least one monohydroxy-substituted aromatic hydrocarbon and at least one dihydroxy-substituted aromatic hydrocarbon, or mixtures of at least one monohydroxy-substituted alkyl hydrocarbon and at least one dihydroxy-substituted aromatic hydrocarbon may be employed.

In yet another, the polycarbonate resin is a linear polycarbonate resin that is derived from bisphenol A and phosgene. In an alternative embodiment, the polycarbonate resin is a blend of two or more polycarbonate resins.

The aromatic polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available. In one embodiment, the aromatic polycarbonate resins are commercially available from General Electric Company, e.g., LEXAN™ bisphenol A-type polycarbonate resins.

The preferred polycarbonates are preferably high molecular weight aromatic carbonate polymers have an intrinsic viscosity (as measured in methylene chloride at 25° C.) ranging from about 0.30 to about 1.00. deciliters per gram. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In one embodiment the optically clear thermoplastic composition comprises polyesters. Methods for making polyester resins and the use of polyester resins in thermoplastic molding compositions are known in the art. Conventional polycondensation procedures are described in the following, see, generally, U.S. Pat. Nos. 2,465,319, 5,367,011 and 5,411,999, the respective disclosures of which are each incorporated herein by reference.

Typically polyester resins include crystalline polyester resins such as polyester resins derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid and have repeating units according to structural formula (VIII)

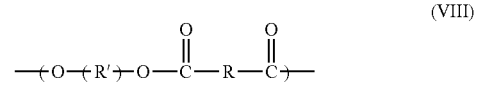

wherein, R' is an alkyl radical compromising a dehydroxylated residue derived from an aliphatic or cycloaliphatic diol, or mixtures thereof, containing from 2 to about 10 carbon atoms. R is an aryl radical comprising a decarboxylated residue derived from an aromatic dicarboxylic acid.

Examples of aromatic dicarboxylic acids from which the decarboxylated residue R may be derived are acids that contain a single aromatic ring per molecule such as, e.g., isophthalic or terephthalic acid, 1,2-di(p-carboxyphenyl) ethane, 4,4'-dicarboxydiphenyl ether, 4,4'-bisbenzoic acid and mixtures thereof, as well as acids contain fused rings such as, e.g., 1,4- or 1,5-naphthalene dicarboxylic acids. In a preferred embodiment, the dicarboxylic acid precursor of residue R is terephthalic acid or, alternatively, a mixture of terephthalic and isophthalic acids.

Typically the polyester resin may comprise one or more resins selected from linear polyester resins, branched polyester resins and copolymeric polyester resins. Suitable linear polyester resins include, e.g., poly(alkylene phthalate)s such as, e.g., poly(ethylene terephthalate) ("PET"), poly(butylene terephthalate) ("PBT"), poly(propylene terephthalate) ("PPT"), poly(cycloalkylene phthalate)s such as, e.g., poly (cyclohexanedimethanol terephthalate) ("PCT"), poly(alkylene naphthalate)s such as, e.g., poly(butylene-2,6-naphthalate) ("PBN") and poly(ethylene-2,6-naphthalate) ("PEN"), poly(alkylene dicarboxylate)s such as, e.g., poly(butylene dicarboxylate).

In a preferred embodiment suitable copolymeric polyester resins include, e.g., polyesteramide copolymers, cyclohexanedimethanol-terephthalic acid-isophthalic acid copolymers and cyclohexanedimethanol-terephthalic acid-ethylene glycol ("PETG") copolymers. The polyester component can, without limitation, comprise the reaction product of a glycol portion comprising 1,4-cyclohexanedimethanol and ethylene glycol, wherein the ethylene glycol is greater than 60 mole percent based on the total moles of 1,4-cyclohexanedimethanol and ethylene glycol with an acid portion comprising terephthalic acid, or isophthalic acid or mixtures of both acids. The polyester component may be prepared by procedures well known to those skilled in this art, such as by condensation reactions. The condensation reaction may be facilitated by the use of a catalyst, with the choice of catalyst being determined by the nature of the reactants. The various catalysts for use herein are very well known in the art and are too numerous to mention individually herein. Generally, however, when an alkyl ester of the dicarboxylic acid compound is employed, an ester interchange type of catalyst is preferred, such as $Ti(OC_4H_9)_6$ in n-butanol.

In one embodiment copolyester in the subject invention is a copolyester as described above wherein the glycol portion has a predominance of ethylene glycol over 1,4-cyclohexanedimethanol, preferably is about greater than 60 molar percent of ethylene glycol based on the total mole percent of ethylene glycol and 1,4-cyclohexanedimethanol, and the acid portion is terephthalic acid. In another embodiment of the present invention the polyester comprises structural units derived from terephthalic acid and a mixture of 1,4-cyclohexane dimethanol and ethylene glycol, wherein said ethylene glycol is greater than about 75 mole percent based on total moles of 1,4-cyclohexane dimethanol and ethylene glycol. In another embodiment, the polyester resin has an intrinsic viscosity of from about 0.4 to about 2.0 dl/g as measured in a 60:40 phenol/tetrachloroethane mixture at 23°-30° C.

The synthesis of polycarbonate polyester blends requires the presence of a catalyst to facilitate the formation of the blend. Generally, the transesterification catalyst (or mixture of catalysts) is added in very small amount (ppm level) during the melt mixing of polycarbonate and polyesters to promote the ester-carbonate exchange reactions. The catalyst employed are compounds of alkaline earth metal oxides such as magnesium oxides, calcium oxide, barium oxide and zinc oxide; alkali and alkaline earth metal salts; a Lewis catalyst such as tin or titanium compounds; a nitrogen-containing basic compound and the like. However, the presence of excess catalyst leads to yellowing or color formation and the blends therefore become less transparent. Quenchers for example compounds like phosphoric acids, are typically added to the blends during the extrusion process to quench the excess catalyst and render the blends transparent. In one embodiment of the present invention additional catalyst or quencher are not added while the thermoplastic resin is being synthesized. In another embodiment of the present invention, the residual catalyst that is present in the polyester component is activated to enhance the ester-carbonate interchange reactions in reactive blending.

The composition of the present invention may include additional components which do not interfere with the previously mentioned desirable properties but enhance other favorable properties such as anti-oxidants, flame retardants, reinforcing materials, colorants, mold release agents, fillers, nucleating agents, UV light and heat stabilizers, lubricants, and the like. Additionally, additives such as antioxidants, minerals such as talc, clay, mica, barite, wollastonite and other stabilizers including but not limited to UV stabilizers, such as benzotriazole, supplemental reinforcing fillers such as flaked or milled glass, and the like, flame retardants, pigments or combinations thereof may be added to the compositions of the present invention.

The range of composition of the blends of the present invention is from about 10 to 90 weight percent of the polycarbonate component, 90 to about 10 percent by weight of the polyester component. In one embodiment, the composition comprises about 25-75 weight percent polycarbonate and 75-25 weight percent of the polyester component.

The rate at which polycarbonate, polyester and optional additives are delivered into the extruder for melt mixing depends on the design of the screws of the extruder. Characteristic residence times for the single-pass extrusion process of the invention varies according to extrusion operating parameters, the screw design.

The conventionally employed screw extruder (10) is depicted in FIG. 1. The screw comprises the screw shaft 12, which in turn has a plurality of screw elements 16. Each element further consists of helical turns called screw flight 14. As the screw flights turn the components of the polymer is pushed forward. The twin screw extruder also comprises of barrels. In the conventional extruder there are ten barrels 34 to 52. The screw flights 22 are oriented in a left handed helix manner, these reverse elements that create higher back pressure. The screw also consists of a first two lobe kneading block 18 which is at the barrel 2 i.e. 36 and a second two lobe kneading block (26) at barrel number 8 (48). There is also present a three lobe kneading block 20 between barrels 3 (38) and 4 (40). Also present in the screw shaft are mixing elements 24, which further facilitates mixing. Atmospheric vent 30 is present at barrel 5 (42) and a vacuum vent 32 at barrel 9 (50). The components are fed into the extruder through the feed 28 at barrel 1 (34). The first two lobe kneading block 18 can be eliminated since at that stage polymer is still in solid state and creates higher torque and in turn it could result in wear of screw element and barrel. Further the three lobe kneading block 20 is longer and that could be reduced. The reverse elements 22 that create higher back pressure resulting in more torque. The second two lobe kneading block 24 is negligible.

Figure 2:
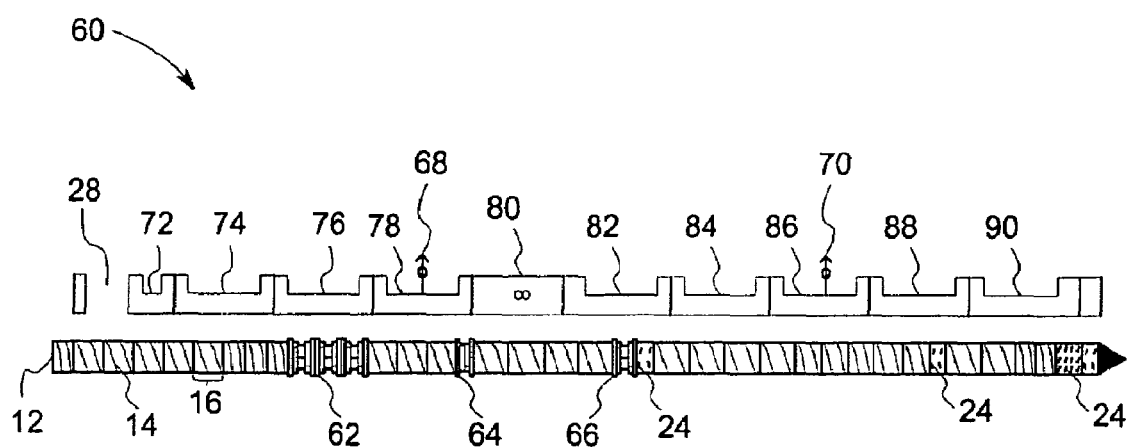
FIG. 2 illustrates a schematic diagram of the extrusion process of the present invention, allowing for extrusion at lower torque and specific energy consumption.

The conventional twin-screw extruder was modified (60) to obtain optically clear resin composition is shown in FIG. 2. The screw was designed with initial progressively compressed elements to increase the degree of fill at barrel No. 2 and 3 (74 and 76 respectively). A three lobe kneading block 62 is placed at barrel 3 (76) this is sufficient to melt down the polymer A vacuum vent (68) is placed at barrel 4 (78) which helps suck the gaseous products that are present effectively. A two lobe kneading block (64) is placed at barrel number 4 (78) which created a nominal back pressure. A two lobe kneading elements 64 and 66 created an effective devolatilazation. This was required when a need arises to add any ingredients through side feeder. A set of mixing element 24 was introduced for effective mixing at barrel 10 (90).

The screw design depicted in FIG. 1 had a couple of limitations as it resulted in higher torque even at lower feed rate and higher temperature. The throughput yield that could be delivered was maximum of 10 Kgs/Hr. In addition the torque produced in the modified screw FIG. 2 is lower at least about 30 percent with respect to the conventionally used screw design. In one embodiment the torque produced is at least about 65 percent. The throughput yield obtained is at least about 10 kilogram per hour (Kg/Hr) and in yet another embodiment the throughput yield is even at higher output of 18 Kg/Hr. Specific energy of consumption is defined as the amount of energy required to process unit quantity of the resin through an extruder, that is the energy consumed by the extruder per out put of the extruder. This is dependent on the throughput yield and the rotations per minute of the screw. In one embodiment the specific energy consumption in the modified screw FIG. 2 is at least about 0.288 kilo watt hour per kilogram (kWh/Kg). In another embodiment the specific energy consumption in the modified screw is at least about 0.335 kWh/Kg and in yet another embodiment the specific energy consumption in the modified screw is about 0.365 kWh/Kg.

In one embodiment, the residence time is about 5 seconds to 30 seconds. In a second embodiment, it is 5 seconds to 20 seconds. In a third embodiment, it is 5 seconds to 10 seconds. In embodiments wherein no catalyst is used, the residence time is at the high end of the range.

In one embodiment of the present invention the optically clear thermoplastic resin composition of the present invention possess good edge cracking resistance and good environmental stress cracking resistance. Edge cracking resistance is a condition wherein visible cracks are formed on the edges of the articles while environmental stress cracking are visible cracks produced when the composition is exposed to environmental conditions.

The molten mixture of the optically clear thermoplastic resin composition so formed to particulate form, example by pelletizing or grinding the composition. The composition of the present invention can be molded into useful articles by a variety of means by many different processes to provide useful molded products such as injection, extrusion, rotation, foam molding calender molding and blow molding and thermoforming, compaction, melt spinning form articles. The articles made from the composition of the present invention may be used widely in house ware objects such as food containers and bowls, home appliances, as well as films.

EXAMPLES

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. While only certain features of the invention have been illustrated and described herein, many modifications and changes will occur to those skilled in the art. Accordingly, these examples are not intended to limit the invention, as defined in the appended claims, in any manner.

In the following examples values for glass transition temperatures (Tg) were determined by differential scanning calorimetry (DSC) at a heating rate of 20° C. per minute. Weight average molecular weights were measured by gel permeation chromatography (GPC) versus polystyrene standards using chloroform as solvent. The GPC column was a Mixed-C column with dimensions 300 millimeters (mm)× 7.5 mm available from Polymer Laboratories. Yellow index or YI was measured on a Gardner Colorimeter model XL-835. The percentage transmission and haze were determined in accordance with test method ASTM D-1003. Melt volume rate was measured as per ISO Standard 1133, 265° C., 240 seconds, 2.16 Kg, and 0.0825 inch orifice. The heat distortion temperature (also known as HDT) test were performed by placing HDT samples edgewise, at load of 1.8 MPa and heating rate of 120 C/hr (degree celsius/hr). Environmental stress cracking resistance was measured making tensile bars of the samples and they were subjected to a constant strain, these were then kept in an oven at 60° C. and the defects on the surface like cracks, crazes were checked. Dynatup Impact test were carried out using ASTM D3763 standard.

Examples 1-3

In the examples, blends were made with 75 weight percent of polycarbonate available from General Electric Company as Lexan® polycarbonate resin blended with a Glycol Modified Polyethylene Terephthalate PETG from SK Chemicals under the name Skygreen S2008. The polycarbonate and the PETG were taken in two mega feeders and the feed ratio was adjusted to maintain the weight ratio of 75% polycarbonate and 25% PETG. The blends were compounded at 250° C. on a modified WP25 mm co-rotating twin screw extruder, yielding a pelletized composition in a single pass process. The modified screw design employed for the process of blending is shown in FIG. 2. Blends of PETG with different grades of polycarbonate (PC100, PC105 and PC175) have been prepared. The resulting pellets were dried for at least six hours at 100.° C. before injection molding into ASTM/ISO test specimens on an 80 ton, four oz. injection molding machine operated at a temperature of about 280° C. Samples molded from the blends were tested for optical properties like % Transmission, % haze and yellow index.

Examples 4 and 5

In the examples, blends were made with 75 weight percent of polycarbonate available from General Electric Company as Lexan® polycarbonate resin blended with a Glycol Modified Polyethylene Terephthalate PETG from another source purchased Eastman Chemical company was also included for the current invention. This PETG grade is different from the previous PETG (SK Chemicals) in terms of residual catalysts and additives. The polycarbonate and the PETG were taken in two mega feeders and the feed ratio was adjusted to maintain the weight ratio of 75% polycarbonate and 25% PETG. The blends were compounded at 250° C. on a modified ZSK25 mm co-rotating twin screw extruder, yielding a pelletized composition in a single pass process. The modified screw design employed for the process of blending is shown in FIG. 2. Blends of PETG with different grades of polycarbonate (PC100, PC105 and PC175) have been prepared. The resulting pellets were dried for at least six hours at 100.° C. before injection molding into ASTM/ISO test specimens on an 80 ton, four oz. injection molding machine operated at a temperature of about 280° C. Samples molded from the blends were tested for optical properties like % Transmission, % haze and yellow index.

Characterization data for blends of polycarbonate PETG which are examples of the invention or which are comparative examples are shown in Table 1. In Table 1 the abbreviations are defined as follows: CEx.=Comparative Example which falls outside the scope of the invention. Comparative Example 1 was a blend of polycarbonate available from General Electric Company as Lexan® polycarbonate resin 105 with a Glycol Modified Polyethylene Terephthalate PETG from SK Chemicals under the name Skygreen S2008 compounded using the same conditions in a standard ZSK25 mm co-rotating twin-screw extruder. The data in Table 1 show that the blends of PC-PETG of the invention possess surprisingly better properties when the modified screw design was employed for compounding purpose.

TABLE 1

| | PC-PETG | HDT (° C.) | Flex Modulus (GPa) | MVR (cc/min) | YI | % T | % H |
|---|---|---|---|---|---|---|---|
| CEx 1 | PC105-SK | 102.63 | 2.46 | 8.786 | 6.4 | 85.9 | 2.14 |
| Ex 1 | PC100-SK | 104.53 | 2.48 | 10.263 | 7.5 | 88.3 | 0.93 |
| Ex 2 | PC105-SK | 106.7 | 2.40 | 6.239 | 4.9 | 87.8 | 2.75 |
| Ex 3 | PC175-SK | 106 | 2.41 | 13.63 | 4.5 | 88.7 | 1.12 |
| Ex 4 | PC100-East | 110.36 | 2.45 | 9.991 | 15.0 | 74.4 | 28.8 |
| Ex 5 | PC105-East | 105.8 | 2.51 | 6.867 | 17.3 | 80.6 | 15.6 |

When 75% by weight of Polycarbonate (GE 100, 105, 175) and 25% by weight of PETG SK S2008 were extruded on ZSK 25 mm Mega compounder on Screw design S1 with limited processing parameters, a clear blend was produced, having correlated Haze of 2.14%, and 85.9% transmission of light and with Yellow Index of 13.912. The same screw design did produced opaque PC/PETG blend when of the PETG was obtained from Eastman Company was employed. Catalyst and quencher had to be introduced to get clear composition with Eastman PETG. The screw design depicted in FIG. 1 had a couple of limitations as it resulted in higher torque even at lower feed rate and higher temperature. The throughput yield that could be delivered was maximum of 10 Kgs/Hr.

The limitations of the screw design depicted in FIG. 1 was overcome by modifying the screw as shown in FIG. 2. When 75%, by weight of Polycarbonate (GE-100, 105,175) and 25% by weight of PETG (SK S2008 or Eastman) were extruded on ZSK 25 mm co rotating twin screw extruder on modified screw design S3 (FIG. 2), that has two vacuum ports at barrel No. 4 and barrel No. 8, a clear composition was produced, having a correlated haze of 0.93-1.12%, and 88.7% of light transmission with Yellow Index of 12.088. This screw design has been found give clear transparent blends of PC/PETG irrespective of the PETG employed. The modified screw design therefore worked well for both the grades of PETG i.e. SK and Eastman grades and did not require addition of any catalyst and quencher to obtain clear blends. In addition the torque produced is much lower about 65% even at higher output of 18 Kgs/Hr.

The environmental stress cracking resistance was found to be dependant on the molecular weight of the blends. The blends displayed good environmental stress cracking resistance with very less and in some cases negligible crack when exposed to butter. Similarly improved edge cracking resistance was also observed in the resin composition of the present invention.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All patents and published articles cited herein are incorporated herein by reference.

The invention claimed is:

1. A method for preparing an optically clear thermoplastic resin composition comprising the steps of:
   (a) melting a polycarbonate and a polyester to form a molten mixture, wherein the polyester comprises structural units derived from terephthalic acid and a mixture of 1,4-cyclohexane dimethanol and ethylene glycol, and said ethylene glycol is greater than 60 mole percent based on total moles of 1,4-cyclohexane dimethanol and ethylene glycol,
   (b) extruding said molten mixture in an extruder to form an extrudate, wherein the extruder is a low torque extruder comprising a plurality of screw elements extending from an upstream feed end to a downstream exit end, and wherein screw elements disposed between the feed end and a first kneading block are progressively compressed in the direction of the first kneading block to increase fill at the first kneading block, and wherein molten mixture is formed and extruded without addition of supplemental catalyst; and
   (c) molding the extrudate into an optically clear thermoplastic resin composition.

2. The method of claim 1, wherein the extruder comprises a first vent section disposed downstream from the first kneading block and upstream from a second kneading block.

3. The method of claim 2, wherein the extruder comprises a third kneading block disposed downstream from the second kneading block, and a plurality of mixing elements between the third kneading block and the exit end.

4. The method of claim 3, wherein the extruder comprises a second vent section disposed downstream from the third kneading block.

5. The method of claim 1, wherein the molten mixture comprises 10-90 weight percent of the polycarbonate component, and 90-10 percent by weight of the polyester component.

6. The method of claim 5, wherein the molten mixture comprises about 25-75 weight percent polycarbonate and 75-25 weight percent of the polyester component.

7. The method of claim 6, wherein the extruder comprises a plurality of screw elements extending from a upstream feed end to a downstream exit end, and wherein screw elements disposed between the feed end and a first kneading block are progressively compressed in the direction of the first kneading block to increase fill at the first kneading block.

8. The method of claim 7, wherein the extruder comprises a first vent section disposed downstream from the first kneading block and upstream from a second kneading block.

9. The method of claim 8, wherein the extruder comprises a third kneading block disposed downstream from the second kneading block, and a plurality of mixing elements between the third kneading block and the exit end.

10. The method of claim 9, wherein the extruder comprises a second vent section disposed downstream from the third kneading block.

* * * * *